United States Patent
Thelen et al.

(10) Patent No.: US 12,344,339 B2
(45) Date of Patent: Jul. 1, 2025

(54) PREEMPTIVE ACTIVE REAR STEER YAW CONTROL

(71) Applicant: GM GLOBAL TECHNOLOGY OPERATIONS LLC, Detroit, MI (US)

(72) Inventors: Jason Lee Thelen, Hartland, MI (US); John Anthony Agrusa, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 190 days.

(21) Appl. No.: 18/308,371

(22) Filed: Apr. 27, 2023

(65) Prior Publication Data
US 2024/0359735 A1    Oct. 31, 2024

(51) Int. Cl.
B62D 6/00    (2006.01)
(52) U.S. Cl.
CPC .......... B62D 6/003 (2013.01); B62D 6/001 (2013.01); B62D 6/002 (2013.01)
(58) Field of Classification Search
CPC ........ B62D 6/001; B62D 6/002; B62D 6/003; B62D 7/159
See application file for complete search history.

(56) References Cited

U.S. PATENT DOCUMENTS

| | | | | |
|---|---|---|---|---|
| 5,184,298 A | * | 2/1993 | Imaseki | B62D 7/159 701/41 |
| 5,648,903 A | * | 7/1997 | Liubakka | B60T 8/1755 701/72 |
| 6,129,424 A | * | 10/2000 | Kubonoya | B60T 8/1755 303/146 |
| 6,564,131 B2 | * | 5/2003 | Sebastian | G05B 9/02 701/41 |
| 7,213,675 B2 | * | 5/2007 | Martens | B62D 7/159 701/41 |
| 11,713,071 B2 | * | 8/2023 | Hidaka | B62D 6/00 701/41 |

FOREIGN PATENT DOCUMENTS

| | | | | |
|---|---|---|---|---|
| CN | 114228828 A | * | 3/2022 | |
| DE | 4330055 A1 | * | 3/1994 | ............... B62D 6/00 |

OTHER PUBLICATIONS

Nagoka, DE 4330055, machine translation. (Year: 1994).*
Xu, CN 114228828, machine translation. (Year: 2022).*

* cited by examiner

*Primary Examiner* — Mark L. Greene (57) ABSTRACT

An active rear steer (ARS) system for a vehicle includes: a rear wheel steering actuator; and an ARS module. The ARS module is configured to operate in a preemptive active rear steer (PARS) wheel yaw control mode and i) receive signal data from first sensors, ii) determine a target PARS wheel angle based on the signal data, iii) determine a target ramp-in rate for the target PARS wheel angle, and iv) preemptively at least one of prevent and mitigate an oversteer event or an understeer event of the vehicle including controlling the rear wheel steering actuator to preemptively adjust a rear wheel angle of the vehicle based on the target PARS wheel angle and the target ramp-in rate.

20 Claims, 6 Drawing Sheets

PREEMPTIVE ACTIVE REAR STEER YAW CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to active rear steer (ARS) systems for vehicles.

An ARS system for a vehicle controls a steering angle of rear wheels of the vehicle. As an example, the adjustment in steering angle of the rear wheels may be based on vehicle speed and steering wheel angle. As another example, the ARS system may steer the rear wheels in a same direction as the front wheels of the vehicle when the vehicle is operating at high speeds (e.g., at freeway speeds over 100 kilometers per hour (kph)) to provide smooth lane changing and/or improved overall vehicle stability. As another example, the ARS system may steer the rear wheels in an opposite direction as the front wheels when the speed of the vehicle is operating at low speeds to allow the vehicle to make a sharper turn. This may occur, for example, while parking the vehicle.

SUMMARY

An active rear steer (ARS) system for a vehicle is disclosed and includes: a rear wheel steering actuator; and an ARS module configured to operate in a preemptive active rear steer (PARS) wheel yaw control mode and i) receive signal data from first sensors, ii) determine a target PARS wheel angle based on the signal data, iii) determine a target ramp-in rate for the target PARS wheel angle, and iv) preemptively at least one of prevent and mitigate an oversteer event or an understeer event of the vehicle including controlling the rear wheel steering actuator to preemptively adjust a rear wheel angle of the vehicle based on the target PARS wheel angle and the target ramp-in rate.

In other features, the ARS module is configured to perform open loop control based on the signal data to determine the target PARS wheel angle and the target ramp-in rate.

In other features, the signal data includes vehicle speed data, steering wheel angle data, accelerator data, and brake actuator data.

In other features, the first sensors include: a vehicle speed sensor configured to detect speed of the vehicle; a steering wheel sensor configured to detect a steering wheel angle; an accelerator sensor configured to detect a position of an accelerator, and a brake sensor configured to detect a position of a brake actuator. The ARS module is configured to determine the target PARS wheel angle and the target ramp-in rate based on the detected speed, the steering wheel angle, the position of the accelerator, and the position of the brake actuator.

In other features, the ARS module is configured to operate in a non-preemptive ARS wheel yaw control mode based on feedback from second sensors.

In other features, the second sensors include a yaw rate sensor and a lateral acceleration sensor.

In other features, the ARS module is configured to enable the PARS wheel yaw control mode based on a driving mode of the vehicle.

In other features, the ARS module is configured to enable the PARS wheel yaw control mode based on an intended driver torque, a steering wheel angle, a speed of the vehicle, a yaw rate of the vehicle, and a lateral acceleration of the vehicle.

In other features, the ARS module is configured to enable the PARS wheel yaw control mode in response to there not being a set restrictive diagnostic trouble code within the vehicle.

In other features, the ARS module is configured to determine a ramp-out rate and based on exit criteria transition out of operating in the PARS wheel yaw control mode.

In other features, the ARS module is configured to initiate a timer when beginning to operate in the PARS wheel yaw control mode and cease operating in the PARS wheel yaw control mode when the timer expires.

In other features, an active rear steer (ARS) method for operating an ARS system of a vehicle is disclosed. The ARS method includes: operating in a preemptive active rear steer (PARS) wheel yaw control mode; receiving signal data from first sensors; determining a target PARS wheel angle based on the signal data; determining a target ramp-in rate for the target PARS wheel angle; and preemptively at least one of preventing and mitigating an oversteer event or an understeer event of the vehicle including controlling a rear wheel steering actuator to preemptively adjust a rear wheel angle of the vehicle based on the target PARS wheel angle and the target ramp-in rate.

In other features, the ARS method further includes performing open loop control based on the signal data to determine the target PARS wheel angle and the target ramp-in rate, the open loop control being based on speed of the vehicle, a steering wheel angle of the vehicle, an accelerator position of the vehicle and a brake actuator position of the vehicle.

In other features, the ARS method further includes: detecting speed of the vehicle; detecting a steering wheel angle; detecting a position of an accelerator; detecting a position of a brake actuator; and determining the target PARS wheel angle and the target ramp-in rate based on the detected speed, the steering wheel angle, the position of the accelerator, and the position of the brake actuator.

In other features, the ARS method further includes operating in a non-preemptive ARS wheel yaw control mode based on feedback from second sensors.

In other features, the second sensors include a yaw rate sensor and a lateral acceleration sensor.

In other features, the ARS method further includes enabling the PARS wheel yaw control mode based on a driving mode of the vehicle.

In other features, the ARS method further includes enabling the PARS wheel yaw control mode based on an intended driver torque, a steering wheel angle, a speed of the vehicle, a yaw rate of the vehicle, and a lateral acceleration of the vehicle.

In other features, the ARS method further includes enabling the PARS wheel yaw control mode in response to there not being a set restrictive diagnostic trouble code within the vehicle.

In other features, the ARS method further includes determining a ramp-out rate and based on exit criteria transitioning out of operating in the PARS wheel yaw control mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An ARS system may be used to adjust a yaw rate of a vehicle. Such a system is referred to as an ARS wheel yaw control system. An ARS wheel yaw control system may adjust an angle of rear wheels of a vehicle to minimize and/or reduce a yaw rate of the vehicle. As an example, an ARS wheel yaw control system may operate to mitigate oversteer and understeer events. The ARS wheel yaw control system may perform closed loop control and adjust the rear wheel angle based on vehicle performance parameters, such as vehicle speed, yaw rate of the vehicle, and lateral acceleration of the vehicle. Based on the vehicle performance parameters, an oversteer or an understeer event can be detected. The ARS wheel yaw control system may then react and adjust the rear wheel angle to mitigate the oversteer or understeer event. This type of ARS wheel yaw control system is referred to as a non-preemptive ARS system. A non-preemptive ARS system is limited in its ability to mitigate oversteer and understeer events and is not able to prevent over steer and understeer events.

The examples set forth herein include preemptive ARS (PARS) wheel yaw control systems for preemptively preventing and/or significantly minimizing the extent of oversteer and understeer events. The PARS wheel yaw control systems are enabled for certain driving modes, such as a performance mode, a sport mode, a performance traction management (PTM) mode, a competition mode, a drifting mode, etc. The PARS wheel yaw control systems may be enabled, for example, when a vehicle is being run on a race track, on dry pavement, and/or at high speeds. The PARS wheel yaw control systems may not be enabled when operating in a tour mode, a snow mode, a normal traction control mode, a normal electronic stability control mode, when experiencing a reduced amount of traction (e.g., on a slick surface, a wet or icy surface, a gravel road, etc.), and/or other conditions in which PARS wheel yaw control is not appropriate. The PARS wheel yaw control systems operate based on vehicle speed and use open loop control based on driver inputs. A PARS wheel yaw control system predicts that an oversteer or an understeer event is about to occur and in response adjusts rear wheel angle to prevent and/or greatly minimize the extent of the oversteer or understeer event. Thus, PARS wheel yaw control is triggered earlier than non-preemptive ARS wheel yaw control to adjust rear wheel angle prior to and/or early on in an oversteer and understeer events. This improves vehicle yaw control and includes receipt of signals and performing preemptive operation to determine driver intent and preemptively actuate rear wheels to prevent oversteer and understeer events. The stated control provides improved vehicle handling characteristics, especially in limit handling scenarios, which is not achievable using a non-preemptive ARS wheel yaw control system operating in accordance with closed loop control. PARS wheel yaw control monitors different signals than the non-preemptive ARS wheel yaw control and better determines driver intent to prevent oversteer and understeer events.

Figure 1:
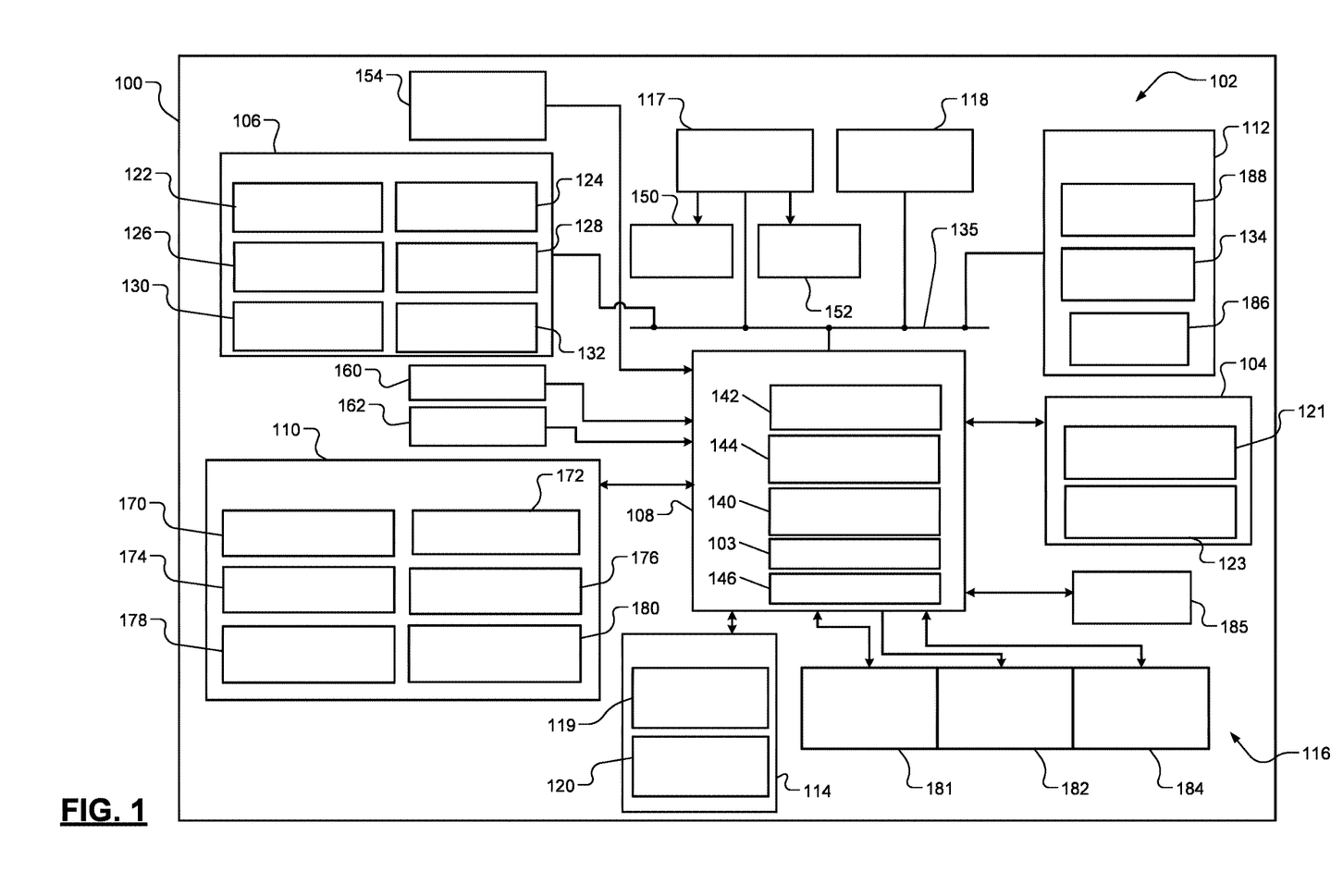
FIG. 1 is a functional block diagram of a vehicle including an example ARS system configured to operate in non-preemptive and preemptive ARS wheel yaw control modes in accordance with the present disclosure.

FIG. 1 shows a vehicle 100 including an ARS system 102 configured to operate in non-preemptive and preemptive ARS wheel yaw control modes. The ARS system 102 includes an ARS module 103, a steering system 104, and sensors 106. Although the ARS module 103 is shown as being implemented by a vehicle control module 108, the ARS module 103 may be implemented elsewhere and/or may be a standalone module. The ARS module 103 is configured to operate in the PARS wheel yaw control mode and the non-preemptive ARS wheel yaw control mode. These modes are further described below with respect to FIGS. 2-5.

The vehicle 100 may be a non-autonomous, partially autonomous or fully autonomous vehicle. The vehicle 100 may be a non-electric, hybrid or fully electric vehicle. The vehicle 100 includes the steering system 104, sensors 106, vehicle control module 108, a memory 110, a brake control system 112, a power source 114, and a propulsion system 116. The vehicle 100 may further include an infotainment module 117 and other modules 118. The power source 114 includes one or more battery packs (one battery pack 119 is shown) and a control circuit 120.

The steering system 104 may include one or more front wheel steering actuators 121 and one or more rear wheel steering actuators 123. The front wheel steering actuators turn the front wheels of the vehicle 100 and the rear wheel steering actuators turn the rear wheels of the vehicle 100. The front wheels are turned together and the rear wheels are turned together. The rear wheels may be turned in-phase with the front wheels or out-of-phase with the rear wheels. When in-phase, the rear wheels are turned in the same direction as the front wheels. When out-of-phase, the rear wheels are turned in an opposite direction as the front wheels. When at 0° and in-phase, the front wheels and the rear wheels are not turned, at a center position, and the vehicle 100 may be moving straight ahead or straight rearward. When at a positive angle and in-phase, the front wheels and the rear wheels are turned to the right of center in a same direction. When at a negative angle and in-phase, the front wheels are the rear wheels are turned to the left of center in a same direction. When the front wheels and rear wheels are turned such that they are not at 0° (or centered) and are out-of-phase, the front wheels and the rear wheels may both be at a positive angle, both be at a negative angle, or one is at a positive angle and the other is at a negative angle.

The sensors 106 may include an accelerator sensor 122, a steering wheel sensor 124, a vehicle speed sensor 126, a yaw rate sensor 128, one or more accelerometers 130, and other sensors 132. The accelerator sensor 122 indicates position and/or angle of an accelerator (e.g., an accelerator pedal). The one or more accelerometers 130 may be part of an inertial measurement unit (IMU). The other sensors 132 may include a velocity sensor, temperature sensors, pressure sensors, cameras, radar sensors, lidar sensors, etc. Additional sensors may further be included, such as a brake actuator sensor 134, which is part of the brake control system 112. The brake actuator sensor 134 indicates position and/or angle of a brake actuator (e.g., a brake pedal).

The modules 103, 108, 117, 118 may communicate with each other and have access to the memory 110 via one or more buses and/or network interfaces. An example network interface 135 is shown. The network interface 135 may include a controller area network (CAN) bus, a local interconnect network (LIN) bus, an auto network communication protocol bus, and/or other network bus.

The vehicle control module 108 controls operation of vehicle systems. The vehicle control module 108 may include the ARS module 103, a brake torque module 140, a mode selection module 142, a parameter adjustment module 144, and a diagnostic trouble code (DTC) module 146. The mode selection module 142 may select a vehicle operating mode, such as any of the modes referred to herein including driving modes, such as the performance mode, the sport mode, the performance traction management (PTM) mode, the competition mode, the drifting mode, the tour mode, the snow mode, the traction control mode, and the electronic stability control mode. The modes may further include a chassis control mode, a split detect mode, a trailer sway detect mode, The chassis control mode may refer to operating in a normal, sport or comfort mode and for each of these modes adjust suspension characteristics and steering characteristics differently. The split detect mode refers to detecting when one or more wheels are on a different surface than one or more other wheels, such that the wheels are experiencing different amounts of traction, and performing operations to compensate for the different amounts of traction. The parameter adjustment module 144 may be used to adjust obtain and/or determine parameters of the vehicle 100 based on, for example, signals from the sensors 106 and/or other devices and modules referred to herein.

The vehicle 100 may further include a display 150, an audio system 152, and one or more transceivers 154. The display 150 and/or audio system 152 may be implemented along with the infotainment module 117 as part of an infotainment system. The display 150 and/or other interface may be used to select a driving mode and/or other operating mode. This allows a user to set the operating modes of the vehicle 100. The display 150 and/or audio system 152 may also be used to indicate status messages. A message may be generated indicating the operating mode and/or when, for example, PARS wheel yaw control and/or non-preemptive ARS wheel yaw control is activated and deactivated.

The vehicle 100 may further include a global positioning system (GPS) receiver 160 and a MAP module 162. The GPS receiver 160 may provide vehicle velocity and/or direction (or heading) of the vehicle and/or global clock timing information. The GPS receiver 160 may also provide vehicle location information. The MAP module 162 provides map information. The map information may include traffic control objects, routes being traveled, and/or routes to be traveled between starting locations (or origins) and destinations.

The memory 110 may store tables 170, sensor data 172, entry criteria 174, exit criteria 176, vehicle parameters 178, and applications 180. The tables 170 may include calibrated tables, which may be used for example during open loop control while in the PARS wheel yaw control mode. As an example, a calibrated table may relate target ARS wheel angles to vehicle speed, steering angle, and driver intended torque. As another example, another calibrated table may relate target ARS wheel angle ramp-in rates to vehicle speed, steering angle and driver intended torque. Driver intended torque may be determined by the ARS module 103 based on the outputs of the accelerator sensor 122 and the brake actuator sensor 134. As yet another example, a calibrated table may relate target ARS wheel angle ramp-out rates to vehicle speed, steering angle and driver intended torque. The sensor data 172 includes data collected from the sensors 106.

Figure 5A:
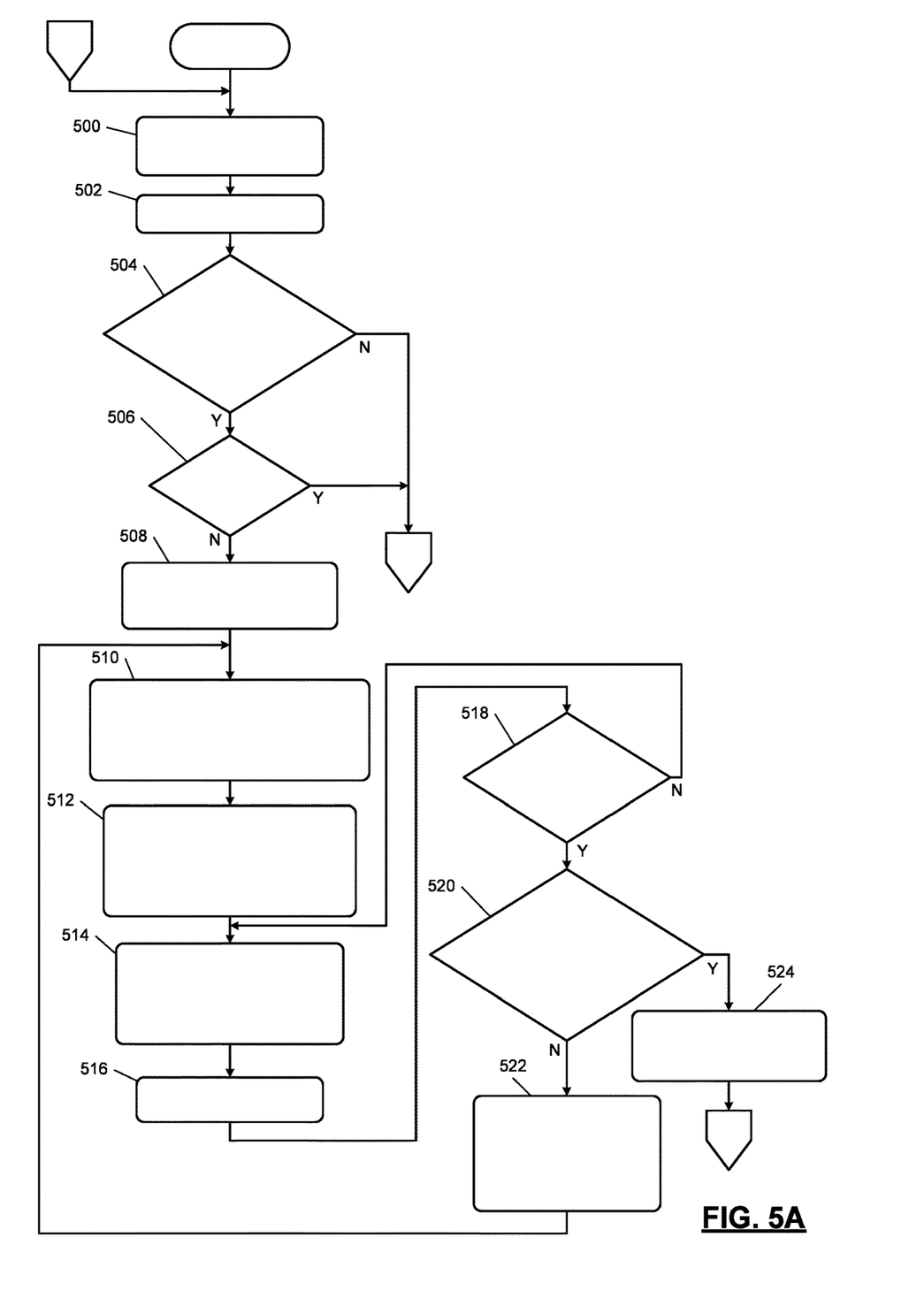
FIGS. 5A-5B (collectively FIG. 5) illustrate an example ARS wheel yaw control method in accordance with the present disclosure.
Figure 5B:
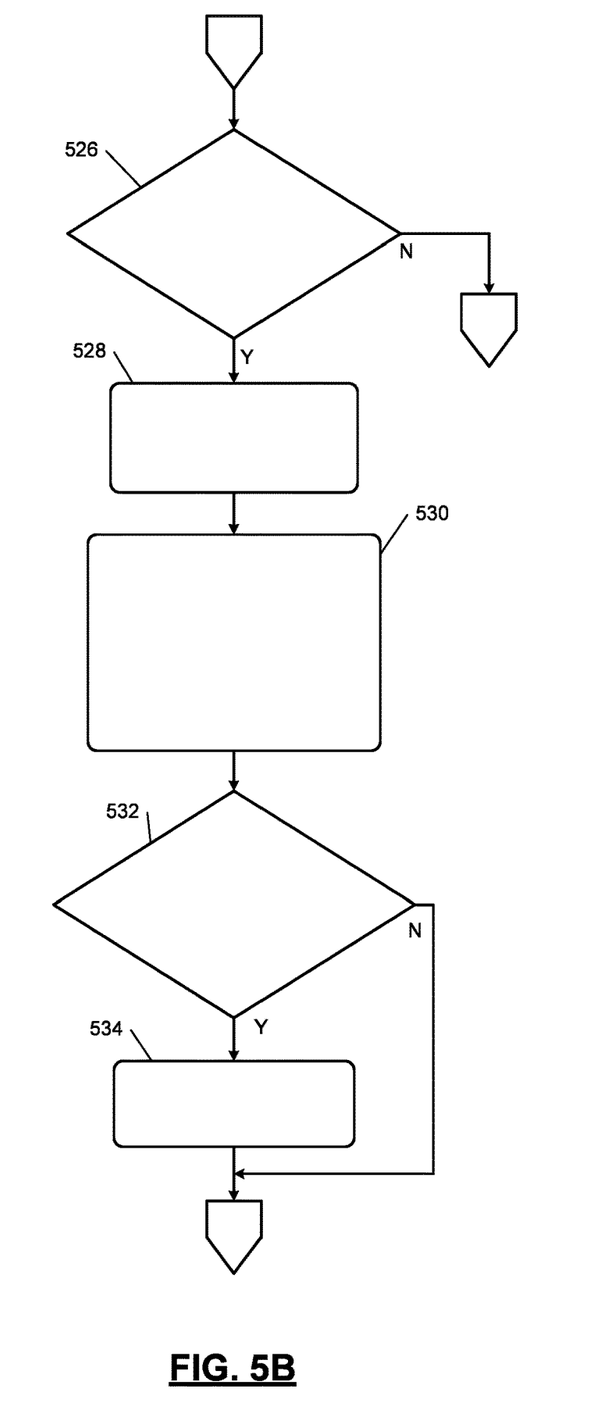

The entry criteria 174 and exit criteria 176 include criteria for activating (or entry into) and deactivating (or exiting from) operation in each of the stated modes. Example entry criteria and exit criteria for operating in and ceasing operation in the PARS wheel yaw control mode are described below with respect to FIGS. 2 and 5. Example entry criteria and exit criteria for operating in and ceasing operation in the non-preemptive ARS wheel yaw control mode is described below with respect to FIG. 5. The vehicle parameters 178 may include parameters to be set and/or current states of parameters of the vehicle 100.

The applications 180 may include applications executed by the modules 108, 117, 118. Although the memory 110 and the vehicle control module 108 are shown as separate devices, the memory 110 and the vehicle control module 108 may be implemented as a single device. The memory 110 may be accessible to the ARS module 103.

The vehicle control module 108 may control operation of the steering system 104, the brake control system 112, an engine 181, a converter/generator 182, a transmission 184, and/or electric motors 185 according to parameters set by the modules 103, 108, 117, 118, 140, 142, 144. The vehicle control module 108 may set some of the vehicle parameters 178 based on signals received from the sensors 106, 134. The vehicle control module 108 may receive power from the power source 114, which may be provided to the steering system 104, the brake control system 112, the engine 181, the converter/generator 182, the transmission 184, and/or the electric motors 185, etc. Some of the vehicle control operations may include enabling fuel and spark of the engine 181, starting and running the electric motors 185, powering any of the systems 102, 104, 112, 116, and/or performing other operations as are further described herein.

The steering system 104, the brake control system 112, the engine 181, the converter/generator 182, the transmission 184, and/or the electric motors 185 may include actuators controlled by the vehicle control module 108 to, for example, adjust fuel, spark, air flow, steering wheel angle, throttle position, pedal position, etc. This control may be based on the outputs of the sensors 106, the GPS receiver 160, the MAP module 162 and the above-stated data and information stored in the memory 110.

The brake control system 112 may be implemented as a brake-by-wire system and/or an electronic brake boost system. In an embodiment, the brake control system 112 may include the brake actuator sensor 134, an electronic brake control module (EBCM) 186, and a brake actuator 188. The brake actuator 188 may include a traditional style brake pedal and/or other brake actuator, such as a handheld brake actuator. The brake actuator sensor 134 detects position and/or angle of the brake actuator 188, which is used to determine displacement of the brake actuator 188. The EBCM 186 may include a motor and an electronic control module for controlling operation of the motor. The motor may adjust brake pressure. The brake pressure may refer to pressure of a hydraulic fluid used to actuate brake pads.

The vehicle control module 108 may determine various parameters including a vehicle speed, an engine speed, steering wheel angle, yaw rate of the vehicle 100, lateral acceleration of the vehicle 100, accelerator position, brake actuator position, an engine torque, a gear state, an accelerometer position, a brake pedal position, an amount of regenerative (charge) power, whether DTC codes are set, and/or other information. This information may be determined by and/or shared with the modules 103, 142, 144, 146.

The ARS system 102 may operate as a PARS wheel yaw control system when in the PARS wheel yaw control mode and as a non-preemptive ARS wheel yaw control system when in the non-preemptive ARS wheel yaw control mode. While operating in the PARS wheel yaw control mode, the ARS system 102 determines driver torque requests and vehicle mode states to better determine driver intent than a closed loop system such as a non-preemptive ARS wheel yaw control system. The signals monitored by the PARS wheel yaw control system are used along with, for example, calibration tables to control rear wheel steering angle. The calibration tables may be pre-generated for respective vehicle performance effects for selected vehicle operating modes. As a result, the PARS wheel yaw control system is able to preemptively prevent and mitigate oversteer and understeer. This may occur prior to yaw of the vehicle exceeding a threshold, which would normally trigger non-preemptive ARS wheel yaw control. In an embodiment, the PARS wheel yaw control system is able to induce oversteer and understeer. This may also occur prior to yaw of the vehicle exceeding a threshold, which would normally trigger non-preemptive ARS wheel yaw control.

Figure 2:
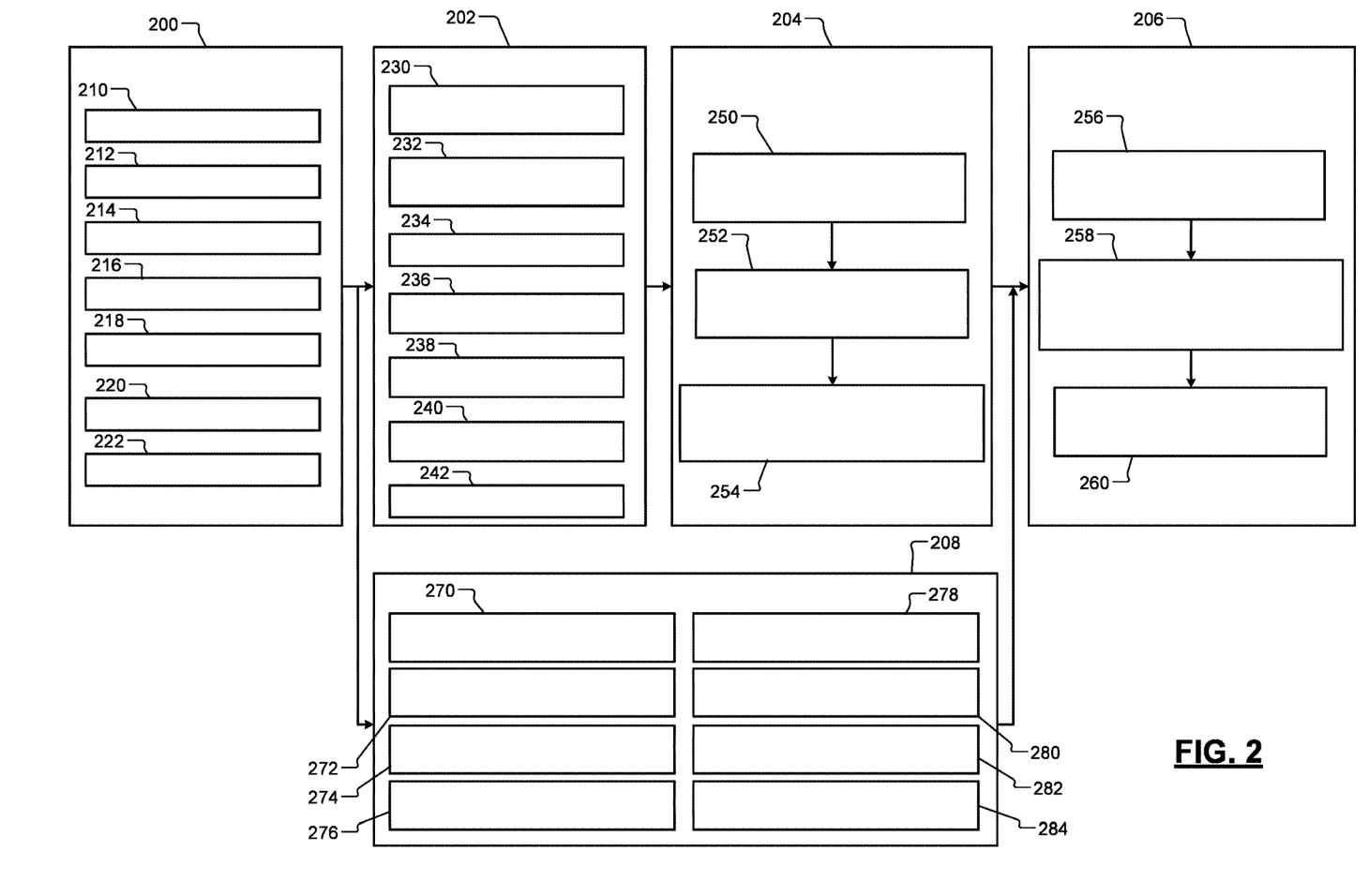
FIG. 2 is an example diagram illustrating preemptive ARS wheel yaw control activation and deactivation in accordance with the present disclosure.

FIG. 2 shows a preemptive ARS wheel yaw control activation and deactivation diagram. Input signals 200 from the sensors 106, 134 of FIG. 1 are received and evaluated based on entry criteria 202. If one or more of the entry criterion are satisfied, the ARS system 102 and ARS module 103 of FIG. 1 operate in the PARS wheel yaw control mode, as represented by box 204. In an embodiment, the ARS system 102 and ARS module 103 operate in the PARS wheel yaw control mode when entry criteria are satisfied. While in the PARS wheel yaw control mode, the ARS module 103 of FIG. 1 monitors the sensors 106, 134 and determines if one or more exit criterion are satisfied. If yes, then the ARS system 102 and ARS module 103 cease operation in the PARS wheel yaw control mode, as represented by box 206. Example exit criteria are represented by box 208. In an embodiment, the ARS system 102 and ARS module 103 cease operation in the PARS wheel yaw control mode when multiple exit criteria are satisfied.

The input signals 200 may include driver mode control state signals 210, driver intended torque signals 212, steering wheel angle signals 214, vehicle speed signals 216, yaw rate signals 218, lateral acceleration signals 220, and DTC status signals 222.

The entry criteria 202 may include: operation in one or more modes appropriate for operation in the PARS wheel yaw control mode (designated 230); intended driver torque being between a predetermined minimum threshold and predetermined maximum threshold and/or being within a predetermined range (designated 232); steering wheel angle (SWA) being between a predetermined minimum threshold and predetermined maximum threshold and/or being within a predetermined range (designated 234); vehicle speed being between a predetermined minimum threshold and predetermined maximum threshold and/or being within a predetermined range (designated 236); yaw rate of vehicle being between a predetermined minimum threshold and predetermined maximum threshold and/or being within a predetermined range (designated 238); lateral acceleration of vehicle being between a predetermined minimum threshold and predetermined maximum threshold and/or being within a predetermined range (designated 240); and/or one or more restrictive DTCs set (designated 242). A restrictive DTC as referred to herein refers to a DTC indicating that a state or condition of a vehicle system is inappropriate for operating in the PARS wheel yaw control mode. For example, if there is a fault with one or more of the sensors 106, 134 a fault with the steering system 104 such as with one of the front and rear steering actuators, and/or other fault, operation in the PARS wheel yaw control mode may be prevented. In an embodiment, the entry criteria 202 includes calibratable values for the minimum and maximum thresholds. The appropriate driving modes for operation in the PARS wheel yaw control mode may include the sport mode, the performance mode, the competition mode, the PTM mode, and/or other suitable high-performance mode. The inappropriate driving modes for operation in the PARS wheel yaw control mode may include the sport mode, the tour mode, the snow mode, the normal traction control mode, the normal electronic stability control mode, the chassis control mode, the split detect mode, the trailer sway detect mode, and/or other suitable low-performance mode. The sport mode may be a high-performance mode or a low-performance mode depending on the parameters associated with the sport mode and the vehicle performance characteristics while in the sport mode.

When the one or more entry criterion are satisfied, the ARS module 103 of FIG. 1, may start a timer and operates in the PARS wheel yaw control mode, represented by box 250. The ARS module 103 then may determine using open loop control a target PARS wheel angle based on i) the vehicle speed and ii) the driver inputs and/or driver intended torque, represented by box 252. In one embodiment, the target PARS wheel angle is determined using both open and closed loop control, where the open loop control is based on open loop calibrated values and the driver inputs, and the closed loop control is based on the vehicle speed. The ARS module 103 may also determine using open loop control a target PARS wheel angle ramp-in rate based on i) the vehicle speed and ii) the driver inputs and/or driver intended torque, represented by box 254. In one embodiment, the target PARS wheel angle ramp-in rate is determined using both open and closed loop control, where open loop control is based on open loop calibrated values and the driver inputs, and the closed loop control is based on the vehicle speed. The preemptive active rear steer yaw control modifies the rear wheel angle to a pre-calibrated value based on values of entry condition variables being monitored.

When the one or more exit criterion are satisfied, the ARS module 103 ceases operation in the PARS wheel yaw control mode, represented by box 256. The ARS module 103 determines a ramp-out rate to transition out of PARS wheel yaw control, represented by box 258. The ARS module 103 may then operate in the non-preemptive ARS wheel yaw control mode if one or more criterion are satisfied for operation in the non-preemptive ARS wheel yaw control mode including use of closed loop control. This is represented by box 260. Subsequent to exit criteria being satisfied, the ARS module 103 may resume monitoring sensors to detect when the entry criteria is again satisfied.

The exit criteria 208 may include: a change in operating mode, such as change in driving mode, such that is no longer appropriate to operate in the PARS wheel yaw control mode (box 270); the intended driver torque is no longer between the corresponding minimum and maximum thresholds and/or the intended driver torque is now outside the corresponding predetermined range (box 272); the SWA is no longer between the corresponding minimum and maximum thresholds and/or the SWA is now outside the corresponding predetermined range (box 274); the vehicle speed is no longer between the corresponding minimum and/or maximum thresholds and/or the vehicle speed is now outside the corresponding predetermined range (box 276); the yaw rate is no longer between the corresponding minimum and maximum thresholds and/or the yaw rate is now outside the corresponding predetermined range (box 278); the lateral acceleration is no longer between the corresponding minimum and maximum thresholds and/or the lateral acceleration is now outside the corresponding predetermined range (box 280); a restrictive DTC is set (box 282); and/or the timer is expired (i.e., has reached a predetermined amount of time) (box 284). In an embodiment, the exit criteria 208 includes calibratable values for the minimum and maximum thresholds.

In an embodiment, the ARS module 103 may exit and/or ramp-out of PARS wheel yaw control mode in response to detecting certain conditions, such as detecting a fault and/or a failure. This may occur prior to the timer expiring. As another few examples, this could also occur when certain thresholds are exceeded, such as when a yaw rate threshold, a lateral acceleration threshold and/or longitudinal acceleration threshold is exceeded warranting exiting of the PARS wheel yaw control mode. As yet another example, PARS wheel yaw control mode may be ended early if an inappropriate driving mode for PARS wheel yaw control is to be activated and/or a restrictive DTC is set.

The input signals, the entry criteria and the exit criteria may be transferred on the network interface 135 or elsewhere. The entry criteria and the exit criteria may be calibrated and/or set prior to usage. The entry criteria and the exit criteria may include calibrated values and/or thresholds. The PARS wheel yaw control activation and deactivation represented by boxes 204 and 206 may be implemented using calibration tables to determine the stated target values.

Figure 3:
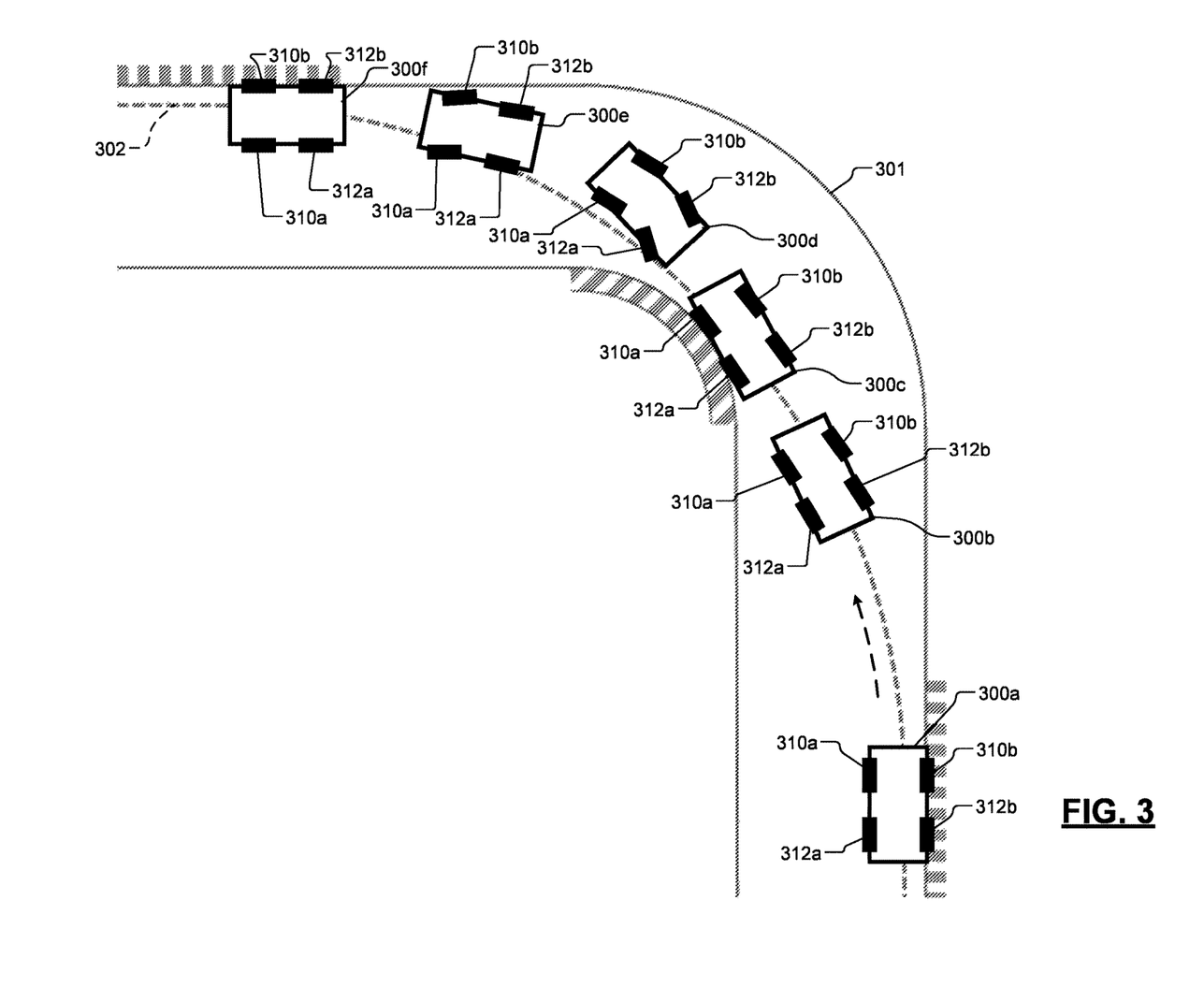
FIG. 3 is a top view of a vehicle operating in the non-preemptive ARS wheel yaw control mode in accordance with the present disclosure.

FIG. 3 shows a vehicle 300 operating in the non-preemptive ARS wheel yaw control mode. In this example the vehicle 300 is entering a curve on a road 301 and is to turn left. Although this is a corner-exiting example, the examples disclosed herein are also applicable to other situations when oversteer and understeer events occur. Shown states of the vehicle 300 are designated 300a, 300b, 300c, 300d, 300e and 300f. The intended and/or ideal path for the vehicle 300 is shown by dashed curved line 302. At state 300c, the vehicle operator may attempt to accelerate out of the turn and thus be requesting for increase output torque. As a result, the ARS module of the vehicle 300 (e.g., the ARS module 103 of FIG. 1) may detect an understeer event and closed loop control is activated to adjust the rear wheel angle to mitigate understeer. The closed loop control may be activated subsequent to state 300c and/or when the vehicle is in state 300d. This is shown by the rear wheels no longer being in-phase with the front wheels. In the example shown, the front wheels are at a negative angle and the rear wheels are at a positive angle. This allows the vehicle to turn quicker and get back to following the path 302. Due to the detection of the understeer event and then reaction to mitigate the understeer event, the vehicle 300 veers off the path 302 for a period of time and then comes back to the path at state 300f. The front wheels 310a, 310b and rear wheels 312a, 312b are shown at corresponding angles for the states 300a-300f.

Figure 4:
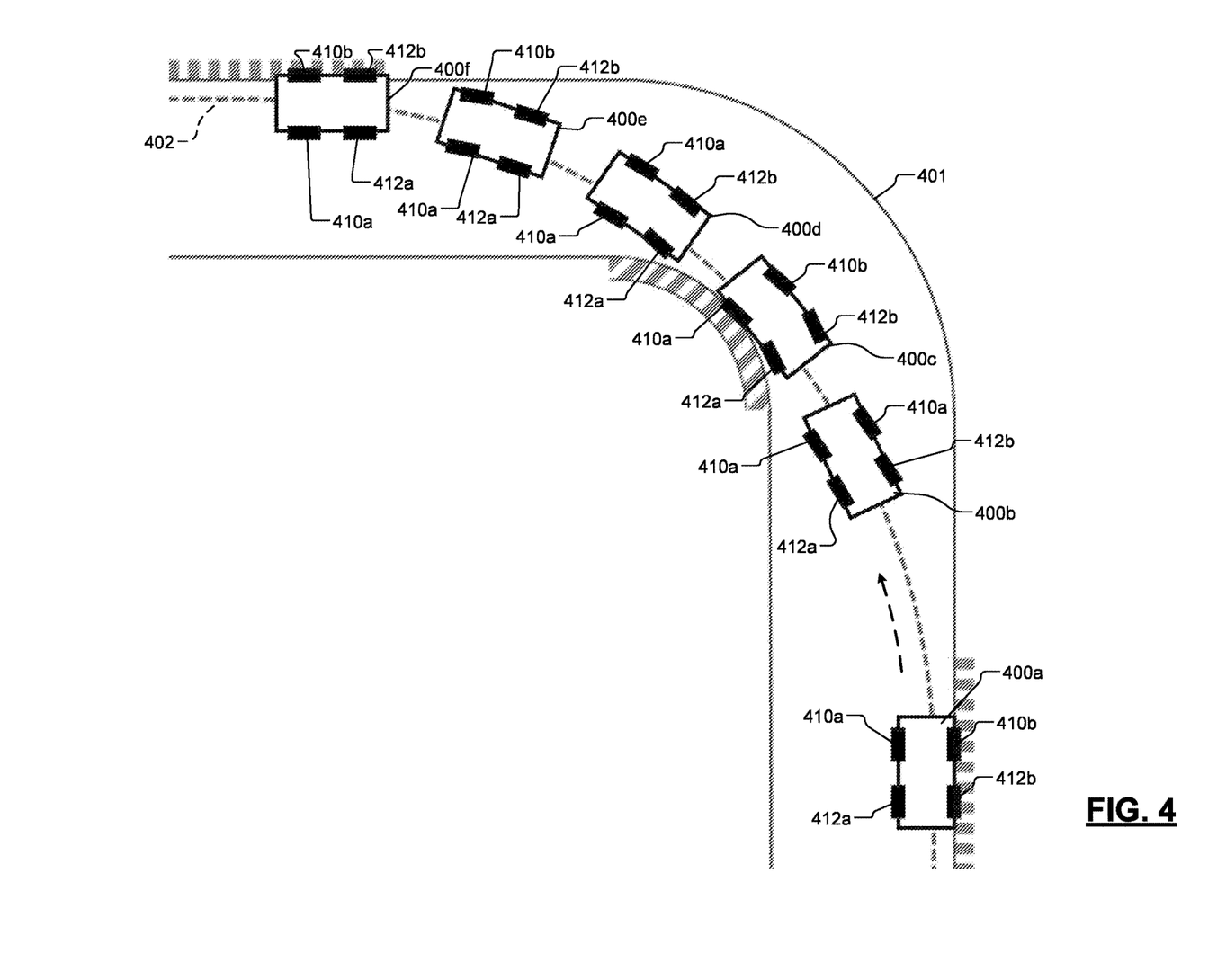
FIG. 4 is a top view of a vehicle operating in the preemptive ARS wheel yaw control mode in accordance with the present disclosure.

FIG. 4 shows a vehicle 400 operating in the PARS wheel yaw control mode. In this example the vehicle 400 is entering a curve on a road 401 and is to turn left. This turn in the road 401 may be the same turn shown in FIG. 3. Although this is a corner-exiting example, the examples disclosed herein are also applicable to other situations when oversteer and understeer events occur. Shown states of the vehicle 400 are designated 400a, 400b, 400c, 400d, 400e and 400f. The intended and/or ideal path for the vehicle 400 is shown by dashed curved line 402. At state 400c, the vehicle operator may attempt to accelerate out of the turn and thus be requesting for increase output torque. The ARS module of the vehicle 400 (e.g., the ARS module 103 of FIG. 1) prior to, when, and subsequent to the request for increased output torque determines that an understeer event is about to occur and/or is occurring. Prior detection may be based on vehicle speed, steering wheel angle, and/or detected, predicted and/or predetermined path of the vehicle. As a result, the ARS module reacts sooner and begins adjusting the rear wheel angle prior to and/or upon receipt of the request. This quicker reaction, causes the vehicle to turn sooner and/or sharper to prevent and/or mitigate the oversteer event. In the example shown, the rear wheels are turned and at a different angle than the front wheels at state 400c. Open loop control may be activated prior to, or at state 300c. This is shown by the rear wheels no longer being in-phase with the front wheels. In the example shown, the front wheels are at a negative angle and the rear wheels are at a positive angle. This allows the vehicle to turn quicker and continue following, closely follow, or quickly get back to following the path 402. Due to the preemptive changing of the rear wheel angle, the vehicle 400 is able to continue following the path 402 through the turn depending on the driving condition, state of vehicle, etc. The front wheels 410a, 410b and rear wheels 412a, 412b are shown at corresponding angles for the states 400a-400f.

The ARS module 103 of FIG. 1, while operating in the non-preemptive ARS wheel yaw control mode, may maintain the rear wheels in-phase with the front wheels when the speed of the vehicle is less than a predetermined speed and adjust the rear wheel angle to be out-of-phase with the front wheels when above the predetermined speed. In an embodiment, the ARS module 103, while operating in the PARS wheel yaw control module adjusts the rear wheel angle to be more out-of-phase with the front wheels for a certain vehicle speed than when operating in the non-preemptive ARS wheel yaw control mode.

In an embodiment, the ARS module 103 performs closed loop control when an oversteer or an understeer event has started and is detected. This may occur, for example, when an oversteer or understeer flag is set. The ARS module 103 begins performing open loop control prior to an oversteer or an understeer event starting. This may occur prior to the oversteer or understeer flag being set.

FIG. 5 shows an ARS wheel yaw control method. The following operations may be iteratively performed. The order in which operations are shown is provided as an example, the operations may be performed in a different order than shown. The following operations may be performed by the ARS module 103 and/or the vehicle control module 108 of FIG. 1.

At 500, the ARS module 103 determines the current one or more operating modes, which include one or more driver modes. At 502, the ARS module 103 collects data from the sensors 106, 134.

At 504, the ARS module 103 determines if at least one first entry criterion is satisfied for activation of the PARS wheel yaw control mode, as described above. This may be based on any, all and/or multiples of the above-described entry criteria. The first entry criteria may permit operation in the PARS wheel yaw control mode when, for example, the vehicle control module 108 is in the performance mode, the sport mode, the PTM mode, the competition mode, the drifting mode and/or other high-performance mode. If yes, operation 506 is performed, otherwise operation 526 is performed.

At 506, the ARS module 103 determines whether a restrictive DTC is set. If no, operation 508 is performed, otherwise operation 526 is performed. At 508, the ARS module 103 initiates a timer and operates in the PARS wheel yaw control mode.

At 510, the ARS module 103 determines target PARS wheel angle using open loop control based on vehicle speed and based on driver inputs. At 512, the ARS module 103 determines target ramp-in rate for target PARS wheel angle using open loop control based on vehicle speed and driver inputs. The ramp-in rate refers to a rate at which the rear wheel angle is changed to the target PARS wheel angle.

At 514, the ARS module 103 adjusts the rear wheel angle based on the target PARS wheel angle and the target ramp-in rate. This includes adjusting the rear wheel steering angle to be out-of-phase with the front wheels. At 516, the ARS module 103 collects sensor data from the sensors 106, 134.

At 518, the ARS module 103 determines whether the rear wheels are at the target PARS wheel angle. If yes, operation 520 is performed, otherwise operation 514 is performed.

At 520, the ARS module 103 determines whether at least one first exit criterion is satisfied to cease operation in the PARS wheel yaw control mode. This may be based on any and/or multiples of the above-described exit criteria. If no, operation 522 is performed, otherwise operation 526 is performed.

At 522, the ARS module 103 monitors the vehicle speed, steering wheel angle and/or the driver requested torque. Operation 510 may be performed subsequent to operation 522. At 524, the ARS module 103 ceases operation in the PARS wheel yaw control mode.

At 526, the ARS module 103 determines whether at least one second entry criterion is satisfied for activation of the non-preemptive ARS wheel yaw control mode. If yes, operation 528 is performed, otherwise operation 500 may be performed. The second entry criteria is different than the first entry criteria. The second entry criteria may be permit operation in the non-preemptive ARS wheel yaw control mode when, for example, the vehicle control module 108 is not in the performance mode, the sport mode, the PTM mode, the competition mode, the drifting mode and/or other high-performance mode. As another example, the steering wheel angle, vehicle speed, yaw rate, lateral acceleration, and/or longitudinal acceleration thresholds to operate in the non-preemptive ARS wheel yaw control mode may be different and/or less than the thresholds for the PARS wheel yaw control mode.

In an embodiment, the non-preemptive ARS wheel yaw control mode is activated when start of an oversteer or an understeer event is detected. As an example, an oversteer event and an understeer event may be detected using a bicycle model (or simplified model) of the vehicle. This may include comparing how the vehicle should be behaving versus how the vehicle is actually behaving.

At 528, the ARS module 103 begins operating in or continues to operate in the non-preemptive ARS wheel yaw control mode. At 530, the ARS module 103 adjusts the rear wheel angle based on the driver inputs and using closed loop control based on vehicle behavior parameters including yaw rate and lateral acceleration to adjust a yaw rate of the vehicle to a target yaw rate. This includes adjusting the rear wheel steering angle to be out-of-phase with the front wheels.

At 532, the ARS module 103 determines whether at least one second exit criterion is satisfied to cease operation in the non-preemptive ARS wheel yaw control mode. If yes, operation 534 is performed, otherwise operation 500 may be performed. At 534, the ARS module 103 ceases operation in non-preemptive ARS wheel yaw control mode. Operation 500 may be performed subsequent to operation 534.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The examples disclosed herein are also applicable to all-wheel-drive (AWD) electric vehicles. During high-speed lateral cornering maneuvers, such as a corner exiting event on an auto-cross or road course, a traditional ARS system can experience understeer events. PARS wheel yaw control allows calibration to respond to driver requested torque by adjusting rear wheel steering angle to preemptively prevent and/or reduce understeer. Traditional ARS systems are only capable of reacting to understeer, and the delay in intervening controls results in a sub-optimal driving experience. Other traditional ARS systems also rely on limiting front axle torque, which limits a vehicle ability to accelerate while controls remain active. This is opposite of what a driver may be requesting for high-performance driving. The ARS systems disclosed herein do not exhibit the disadvantages of these traditional systems.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An active rear steer (ARS) system for a vehicle comprising:
a rear wheel steering actuator; and
an ARS module configured to operate in a preemptive active rear steer (PARS) wheel yaw control mode and i) receive signal data from a first plurality of sensors, ii) determine a target PARS wheel angle based on the signal data, iii) determine a target ramp-in rate for the target PARS wheel angle, and iv) preemptively at least one of prevent and mitigate an oversteer or understeer event of the vehicle including controlling the rear wheel steering actuator to preemptively adjust a rear wheel angle of the vehicle based on the target PARS wheel angle and the target ramp-in rate,
wherein the ARS module is further configured to i) predict a path of the vehicle, ii) determine intent of a driver of the vehicle based on a plurality of parameters of the vehicle, ill) based on the predicted path and the driver intent, predict the oversteer or understeer event is about to occur, and iv) in response to predicting the oversteer or understeer event, adjust the rear wheel angle prior to the oversteer or understeer event occurring to prevent the oversteer or understeer event or minimize the extent of the oversteer or understeer event.

2. The ARS system of claim 1, wherein the ARS module is configured to perform open loop control based on the signal data to determine the target PARS wheel angle and the target ramp-in rate.

3. The ARS system of claim 1, wherein the signal data includes vehicle speed data, steering wheel angle data, accelerator data, and brake actuator data.

4. The ARS system of claim 1, wherein:
the first plurality of sensors comprise
a vehicle speed sensor configured to detect a speed of the vehicle,
a steering wheel sensor configured to detect a steering wheel angle,
an accelerator sensor configured to detect a position of an accelerator, and
a brake sensor configured to detect a position of a brake actuator,
the ARS module is configured to determine the target PARS wheel angle and the target ramp-in rate based on the detected speed, the steering wheel angle, the position of the accelerator, and the position of the brake actuator.

5. The ARS system of claim 1, wherein the ARS module is configured to operate in a non-preemptive ARS wheel yaw control mode based on feedback from a second plurality of sensors.

6. The ARS system of claim 5, wherein the second plurality of sensors comprise a yaw rate sensor and a lateral acceleration sensor.

7. The ARS system of claim 1, wherein the ARS module is configured to enable the PARS wheel yaw control mode based on a driving mode of the vehicle.

8. The ARS system of claim 1, wherein the ARS module is configured to enable the PARS wheel yaw control mode in response to there not being a set restrictive diagnostic trouble code within the vehicle.

9. The ARS system of claim 1, wherein the ARS module is configured to determine a ramp-out rate and based on exit criteria transition out of operating in the PARS wheel yaw control mode.

10. The ARS system of claim 1, wherein the ARS module is configured to initiate a timer when beginning to operate in the PARS wheel yaw control mode and cease operating in the PARS wheel yaw control mode when the timer expires.

11. The ARS system of claim 1, wherein the ARS module is configured to:
determine whether to operate in the PARS wheel yaw control mode or a non-preemptive ARS wheel yaw control mode based on whether a driver mode has been selected for operating in the PARS wheel yaw control mode;
while in the non-preemptive ARS wheel yaw control mode, adjust the rear wheel angle in response to a predetermined threshold being exceeded; and
while in the PARS wheel yaw control mode and prior to the oversteer or understeer event and while the predetermined threshold has not been exceeded, preemptively adjust the rear wheel angle to prevent the oversteer or understeer event from occurring.

12. An active rear steer (ARS) system for a vehicle comprising:
a rear wheel steering actuator; and
an ARS module configured to operate in a preemptive active rear steer (PARS) wheel yaw control mode and i) receive signal data from a first plurality of sensors, ii) determine a target PARS wheel angle based on the signal data, iii) determine a target ramp-in rate for the target PARS wheel angle, and iv) preemptively at least one of prevent and mitigate an oversteer or understeer event of the vehicle including controlling the rear wheel steering actuator to preemptively adjust a rear wheel angle of the vehicle based on the target PARS wheel angle and the target ramp-in rate,
wherein the ARS module is configured to enable the PARS wheel yaw control mode based on an intended driver torque, a steering wheel angle, a speed of the vehicle, a yaw rate of the vehicle, and a lateral acceleration of the vehicle.

13. An active rear steer (ARS) method for operating an ARS system of a vehicle, the ARS method comprising:
operating in a preemptive active rear steer (PARS) wheel yaw control mode;
receiving signal data from a first plurality of sensors;
predicting a path of the vehicle;
determining intent of a driver of the vehicle based on a plurality of parameters of the vehicle;
based on the predicted path and the driver intent, predicting an oversteer or understeer event about to occur; and
in response to predicting the oversteer or understeer event about to occur,
determining a target PARS wheel angle based on the signal data,
determining a target ramp-in rate for the target PARS wheel angle, and
preemptively at least one of preventing and mitigating the oversteer event or understeer event of the vehicle including controlling a rear wheel steering actuator to preemptively adjust a rear wheel angle of the vehicle based on the target PARS wheel angle and the target ramp-in rate prior to the oversteer or understeer event occurring to prevent the oversteer or understeer event or minimize the extent of the oversteer or understeer event.

14. The ARS method of claim 13, further comprising performing open loop control based on the signal data to determine the target PARS wheel angle and the target ramp-in rate, the open loop control being based on a speed of the vehicle, a steering wheel angle of the vehicle, an accelerator position of the vehicle and a brake actuator position of the vehicle.

15. The ARS method of claim 13, further comprising:
detecting a speed of the vehicle;
detecting a steering wheel angle;
detecting a position of an accelerator;
detecting a position of a brake actuator; and
determining the target PARS wheel angle and the target ramp-in rate based on the detected speed, the steering wheel angle, the position of the accelerator, and the position of the brake actuator.

16. The ARS method of claim 13, further comprising operating in a non-preemptive ARS wheel yaw control mode based on feedback from a second plurality of sensors,
wherein the second plurality of sensors comprise a yaw rate sensor and a lateral acceleration sensor.

17. The ARS method of claim 13, further comprising enabling the PARS wheel yaw control mode based on a driving mode of the vehicle.

18. The ARS method of claim 13, further comprising enabling the PARS wheel yaw control mode based on an intended driver torque, a steering wheel angle, a speed of the vehicle, a yaw rate of the vehicle, and a lateral acceleration of the vehicle.

19. The ARS method of claim 13, further comprising enabling the PARS wheel yaw control mode in response to there not being a set restrictive diagnostic trouble code within the vehicle.

20. The ARS method of claim 13, further comprising determining a ramp-out rate and based on exit criteria transitioning out of operating in the PARS wheel yaw control mode.

* * * * *